June 18, 1968   W. H. JONES ET AL   3,389,045
MULTICOLORED OMBRE FILMS AND PROCESSES OF PRODUCING SAME
Filed Aug. 3, 1964

INVENTORS
WILLIAM H. JONES
JACK W. SHEDRICK
EMANUEL LAPREZIOSA

ATTORNEYS

United States Patent Office 3,389,045
Patented June 18, 1968

3,389,045
MULTICOLORED OMBRÉ FILMS AND PROCESSES OF PRODUCING SAME
William H. Jones, Temperance, Mich., and Jack W. Shedrick, New Stanton, and Emanuel Lapreziosa, Jeanette, Pa., assignors to The General Tire & Rubber Company, Akron, Ohio, a corporation of Ohio
Filed Aug. 3, 1964, Ser. No. 386,852
6 Claims. (Cl. 161—166)

ABSTRACT OF THE DISCLOSURE

Thin thermoplastic films having a multicolored ombré effect are produced by controlled calendering of several separate thermoplastic materials of different color. The ombré films are useful in making decorative curtains, wearing apparel, surface coverings for floor, walls, furniture and the like.

---

Examples of the various methods known to be useful to produce decorative effects in thermoplastic materials are outlined in U.S. Patent 2,888,975, including marbleizing, inlaying, mottling, graining and variegating. The methods of this present invention differ from the prior methods in that they produce a more subtle decorative effect accomplished by blending various colors and shades to present a spectrum of slight nuances that progress in graduated manner from one color blend to another.

It is a principal object of this invention to provide films, sheets and comparable flexible smooth surface articles comprising continuous blends of color in spaced relation to each other. Further objects include:

(1) The provision of unique methods to pre-select various colors and blends at pre-determined locations on decorative sheets.

(2) The provision of plastic sheets exhibiting a plurality of colors that blend together so subtly that a viewer of the sheet is scarcely aware the sheet comprises several colors when it is outstretched, although the difference in colors are readily apparent when different colored sections are overlapped.

(3) The provision of new forms of flexible plastic films characterized by a multicolored ombré effect and new calendering procedures for making such films.

(4) The provision of new and unique varied colored sheets that present a spectrum of slight nuances that progress in graduated manner from one color blend to another.

Other objects and further scope of applicability of the present invention will become apparent from the detailed description given hereinafter; it should be understood, however, that the detailed description and specific examples, while indicating preferred embodiment of the invention, are given by way of illustration only, since various changes and modifications within the spirit and scope of the invention will become apparent to those skilled in the art from this detailed description.

An understanding of this invention can be obtained from the following description and the accompanying drawings which are illustrative of the practice of this invention:

Figure 1:
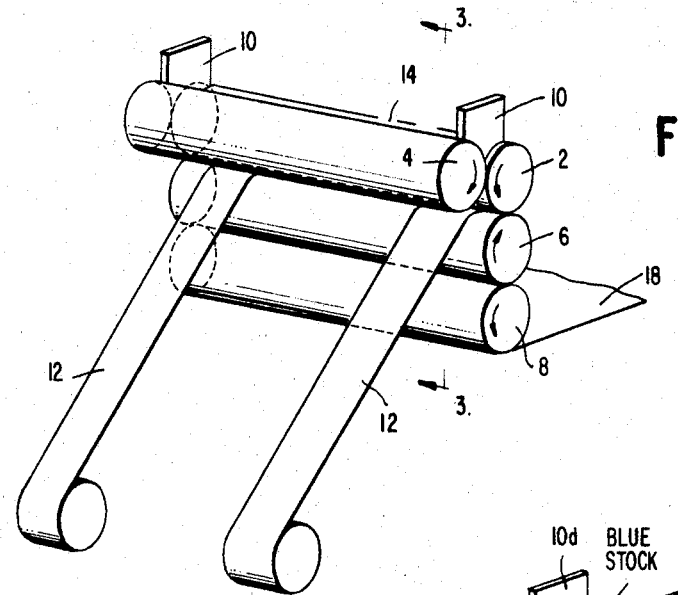
FIGURE 1 is a perspective side view of a flow roll calender operating according to one embodiment of the invention to form ombré film in accordance with the invention.

Referring to FIGURE 1 of the drawings, the calendering apparatus comprises a top roll 2 and adjacent thereto an offset roll 4. Positioned beneath the top roll are a middle roll 6 and a bottom roll 8. The apparatus also includes the stock guides 10 that confine the edges of the hot stock bank 14. All of the rolls are heated by conventional means. The following example illustrates operation of the invention as embodied in FIGURE 1 and further illustrated in FIGURE 3.

Example I

This example produces ombré film using a "strip feed method." In this example, and throughout the remainder of the specification and claims, all parts and percentages are by weight unless otherwise specified.

A film which is green in the center and blue along the edges was prepared in the following manner:

A blue film was calendered from a plastic composition formed of 300 parts copolymer of vinyl chloride (90%) and vinyl acetate (10%), 100 parts of dioctyl phthalate and 5 parts of blue dye approximately 0.002" thick and slit into strips approximately 18" wide.

Figure 3:
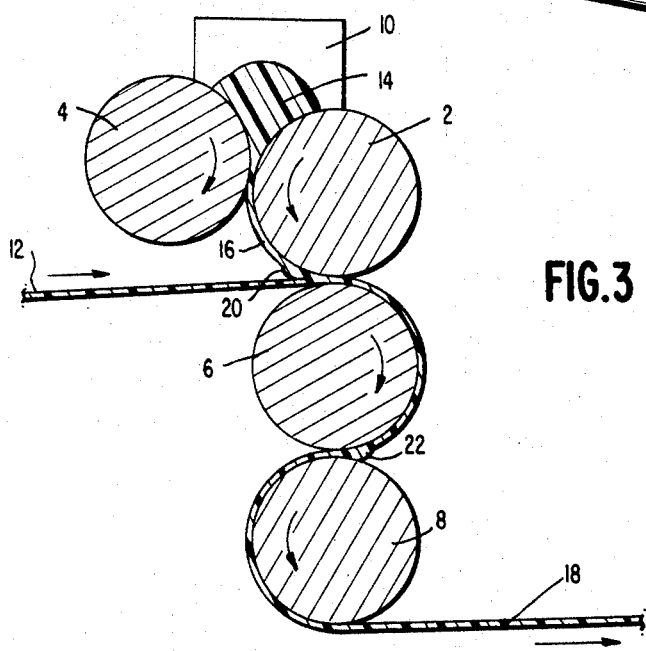
FIGURE 3 is a sectional view taken along the line 3—3 of FIGURE 1.

In another run, green film was calendered from the same composition containing green dye in place of blue dye on a four roll calender device at a run thickness between 0.003" to 0.005" while unheated strips 12 of the previously calendered blue film (0.002" x 18") were fed onto the surface of hot green calendered film 16 between calendered rolls 2 and 6 as illustrated in FIGURE 3. The two strips of blue film were positioned one on each side of the hot green film parallel to the axes of the calender rolls and the outer edges of the strips were aligned with the outer edges of the hot green sheet as it came off the calender. The position of alignment was varied depending upon the amount of flow out of the blue film. The result was a multicolored film 18, blue along the outer edges and green down the center with a soft blending of colors between the two basic colors.

The color along the edges can be preselected by the proper mixing of strip color and base sheet color before calendering, e.g., if a sheet is desired which is green along the edges and yellow in the middle, blue strips would be fed into the rolls while running yellow base film to yield the desired green edge.

It has been found that to obtain a 0.004" to 0.005" thick finished sheet, a 0.002" thick second color film strip is advantageous. With a careful selection of plastic, the strips soften quickly in the system and become an integral part of the finished sheet with a minimum of surface defects.

Referring to FIGURE 3, the manner of the blending of the precalendered sheets 12 into the hot sheet 16 of plastic from the stock bank 14 is illustrated. The unheated sheet 12 enters between rollers 2 and 6 into the blending bank 20 where it becomes fused into the hot sheet 16. The resulting sheet is further blended into the final ombré effect sheet 18 at the blending bank 22 which exists at the entrance to the nip between rollers 6 and 8.

Figure 2:
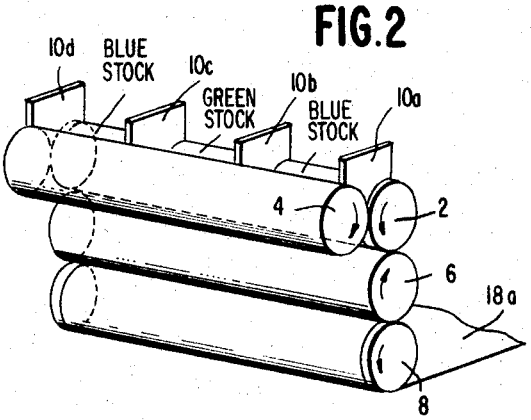
FIGURE 2 is a perspective side view of a flow roll calender operating according to another embodiment of the invention.

In the embodiment of the invention disclosed in FIGURE 2, guides are provided for calendering three separate banks of hot stock. The following example illustrates this embodiment of the invention which may be referred to as a "pig feed method."

Example II

The process was achieved by feeding hot stock of the desired colors into the calender using four guides 10a–10d set between rolls 2 and 4, instead of the usual two guides used to restrict the flow of stock. Hot blue stock was fed between two pairs of guides 10a and 10b and guides 10c and 10d. Hot green stock was fed between two other pairs of guides 10b and 10c. The plastic compositions used were as in Example I and this method also produced a unique multicolored ombré effect film 18a.

Both the "strip feed" and "pig feed" methods can be varied to include the following embodiments.

(1) A first color along the edges and a second color in the middle of the sheet blended at the junctions of the first and second colors.

(2) A sheet containing color stripings of varying width.

(3) A sheet containing a plurality of colors.

(4) A sheet containing one color of varying shades.

(5) A sheet of discontinuous streaks.

(6) A sheet containing all of the above embodiments wherein the sheet is composed of either translucent or opaque plastic as contrasted to transparent colored films or sheets.

The process of the invention appears applicable to any thermoplastic resin composition known to be useful for calendering into sheets or films. It is contemplated that any such thermoplastic materials may be employed in the process of this invention. Examples of suitable compositions include: vinyl ester polymers; copolymers of butadiene-styrene; polymers of vinyl chloride; polymers of vinylidene chloride; polymers of alkyl acrylates and methacrylates, e.g., ethyl acrylate, methyl acrylate, butyl acrylate, methyl ethyl acrylate; copolymers of vinyl chloride and vinylidene chloride; polyacrylonitrile, and olefin polymers such as polybutylene, polyethylene and polypropylene.

Compositions based upon polyvinyl chloride are particularly useful, including vinyl chloride homopolymer and copolymers such as vinyl chloride-vinyl acetate copolymer, vinyl chloride-dibutyl maleate copolymer and the like. Such vinyl chloride compositions advantageously contain from 25% to 75% of plasticizer based on the weight of vinyl chloride polymer. The plasticizers may be liquid or semi-solid, e.g., the phthalates such as di (2-ethyl hexyl) phthalate, di-n-octyl phthalate, butyl benzylphthalate, dibutoxyethyl phthalate; adipates and azelates, e.g., di-m-hexyl adipate, dinonyl adipate, di (butoxyethyl) adipate, di-(3,5,5-trimethylhexyl) adipate, dioctyl azelate; glycolic acid derivatives such as methyl phthalyl ethyl glycolate; phosphates such as triphenyl phosphate, cresyl diphenyl phosphate; fatty acid derivatives such as butyl acetyl ricinoleate and low molecular weight polycarboxylic acid polyhydric alcohol condensates. The calendering compositions may include any of the pigments, fillers, stabilizers, lubricants, etc., that are usually found in compositions formulated for their decorative effect.

The invention sought to be protected by United States Letters Patent is defined in the following claims.

We claim:

1. A process for producing flexible plastic multicolor ombré films on a calendering device having an offset calender roll, a top calender roll, a middle calender roll and a bottom calender roll which comprises calendering through the bight of the offset calender roll and the top calender roll a hot softened film from a hot stock bank of first thermoplastic material, feeding at least one strip of second thermoplastic material different in color from said first thermoplastic material between the bight of said top calender roll and said middle calender roll onto at least part of the exposed surface of the hot softened film, said strip overlapping at least part of said hot softened film, calendering the integrated sheet to desired thickness to form a continuous homogeneous multicolored ombré sheet containing continuous blends of color, and thereafter removing said sheet from said bottom calender roll.

2. A multicolored ombré thermoplastic composition film containing continuous blends of color in graduated spaced relation to each other prepared by the process of claim 1.

3. A process in accordance with claim 1 in which the hot stock thermoplastic material is vinyl chloride polymer composition.

4. A process in accordance with claim 1 in which the second thermoplastic composition material is vinyl chloride polymer composition.

5. A process which comprises calendering a hot first plastic material into a hot flexible sheet having a thickness ranging between 0.003" to 0.005", feeding at least one unheated strip of second thermoplastic composition material different in color from said first thermoplastic material onto at least part of the exposed surface of said hot flexible sheet, the longitudinal edges of said strip being substantially aligned with the edges of said hot flexible sheet, and calendering the resulting integrated mass to desired thickness to form a continuous homogeneous multicolored ombré sheet containing continuous blends of color.

6. A process which comprises creating a plurality of hot stock banks of thermoplastic composition material which are maintained separate from one another, the color of adjacent banks of said material being different, forming continuous thin sheets from each of said banks by calendering, butt joining the sheets and continuing said calendering to form a single continuous integrated sheet having a thickness of about 3 to 5 mils, exhibiting a multicolor ombré effect containing a continuous blend of colors.

References Cited

UNITED STATES PATENTS

| 1,730,673 | 10/1929 | Mell | 264—76 |
| 1,998,866 | 4/1935 | Fowler | 18—2 X |
| 2,625,712 | 1/1953 | Eaby | 264—76 |
| 2,740,991 | 4/1956 | Hess et al. | 264—171 X |
| 3,015,356 | 1/1962 | White et al. | 161—166 X |

EARL M. BERGERT, *Primary Examiner.*

T. R. SAVOIE, *Assistant Examiner.*